(12) United States Patent
Nelson

(10) Patent No.: US 6,791,329 B2
(45) Date of Patent: Sep. 14, 2004

(54) PORTABLE METAL DETECTION AND CLASSIFICATION SYSTEM

(75) Inventor: Carl V. Nelson, Derwood, MD (US)

(73) Assignee: The Johns Hopkins University, Baltimore, MD (US)

( * ) Notice: Subject to any disclaimer, the term of this patent is extended or adjusted under 35 U.S.C. 154(b) by 63 days.

(21) Appl. No.: 10/222,055

(22) Filed: Aug. 16, 2002

(65) Prior Publication Data

US 2003/0034778 A1 Feb. 20, 2003

Related U.S. Application Data

(60) Provisional application No. 60/313,049, filed on Aug. 17, 2001, and provisional application No. 60/365,230, filed on Mar. 18, 2002.

(51) Int. Cl.[7] ................................................. G01V 3/08
(52) U.S. Cl. ...................................................... 324/329
(58) Field of Search .............................. 324/326–329, 324/334, 232, 239–243

(56) References Cited

U.S. PATENT DOCUMENTS

| | | | | |
|---|---|---|---|---|
| 3,882,374 A | * | 5/1975 | McDaniel | 324/329 |
| 3,942,105 A | * | 3/1976 | Bondarenko et al. | 324/234 |
| 4,016,486 A | | 4/1977 | Pecori | |
| 4,345,208 A | * | 8/1982 | Wilson | 324/329 |
| 4,600,356 A | | 7/1986 | Bridges et al. | |
| 4,926,127 A | * | 5/1990 | Auslander et al. | 324/329 |
| 4,942,360 A | | 7/1990 | Candy | 324/329 |
| 5,307,272 A | * | 4/1994 | Butler et al. | 700/90 |
| 5,325,873 A | * | 7/1994 | Hirschi et al. | 128/899 |
| 5,767,669 A | | 6/1998 | Hansen et al. | |
| 5,969,528 A | | 10/1999 | Weaver | 324/329 |
| 5,970,841 A | | 10/1999 | Trocino | 89/1.13 |
| 6,026,135 A | | 2/2000 | McFee et al. | 376/159 |
| 6,064,209 A | | 5/2000 | Banerjee | |
| 6,097,190 A | | 8/2000 | Foerster | 324/329 |
| 6,174,209 B1 | | 1/2001 | Cooper | 440/12.5 |
| 6,268,723 B1 | * | 7/2001 | Hash et al. | 324/243 |
| 6,333,631 B1 | | 12/2001 | Das et al. | 324/326 |

FOREIGN PATENT DOCUMENTS

JP  10-90432  *  4/1998

OTHER PUBLICATIONS

PCT International Search Report, PCT/US02/26240, Mailed Jan. 15, 2003.
Wide Bandwidth Time–Domain Electromagnetic Sensor for Metal Target Classification, IEEE Trans. on Geoscience & Remote Sensing, vol 39, No. 6, 6/01, Nelson et al.
Wide Bandwidth, Time Decam Responses from Low–Metal Mines & Ground Voids, Proc. of SPIE: Dept. & Remed. Tech. for Mines & Mine Like Targets, 1, vol. 4394, pps. 55–64, 4/01 by Nelson.

* cited by examiner

*Primary Examiner*—Jay Patidar
(74) *Attorney, Agent, or Firm*—Albert J. Fassulo, II

(57) ABSTRACT

A metal detector system including a chassis for supporting electromagnetic sensor components above a medium such as soil or water. A transmitter coil and two receiver coils are attached to the chassis. A propulsion system is attached to the chassis between or adjacent to the receiver coils. The location of the propulsion system causes electromagnetic interference signals emanating from the propulsion system to be received at a nominally equal magnitude by each of the receiver coils.

7 Claims, 7 Drawing Sheets

PORTABLE METAL DETECTION AND CLASSIFICATION SYSTEM

CROSS-REFERENCE TO RELATED APPLICATIONS

This application claims the benefit of the co-pending U.S. Provisional Patent Applications No. 60/313,049, filed on Aug. 17, 2001, and No. 60/365,230, filed on Mar. 18, 2002, both of which are herein incorporated by reference.

STATEMENT OF GOVERNMENT INTEREST

This invention was made with Government support under Contract No. DAAB 15-00-C- 1008 awarded by the Department of the Army. The Government has certain rights in the invention.

BACKGROUND OF THE INVENTION

1. Field of the Invention

The present invention relates to a compact, lightweight, and inexpensive portable system for metal detection and identification generally and, in particular, for landmine detection and classification.

2. Background

The World Health Organization estimates that 30,000 people are maimed or killed annually by landmines. Eight out of ten injured are civilians and seven out of ten are children. Between 100 million to 200 million unexploded mines lie buried worldwide and the United Nations (UN) estimates that five million additional mines are planted each year.

Landmines are low-priced, simple to construct and easy to plant. While de-mining, or clearing minefields, is expensive, time-consuming and d costs about $3 to make and moments to plant. But according to the UN, using present methods it would cost $33 billion to clear the world's current minefields. The price of lost lives, personal injuries, and economic rehabilitation for landmine-infested areas is not included in that cost.

Landmines are made up of three basic parts: a container, an explosive charge, and a detonation device. However, de-mining is made even more difficult because mines are made in a wide variety of shapes and sizes with many different materials. Such variety makes it difficult to calibrate sensors to reliably detect mines. Today landmine containers are generally created from plastic, so they are not detectable by conventional metal detectors. Also, many mines are small enough to fit into a child's hand. These small packages are dispersed over large areas, buried one to two inches underground, and can be very difficult to detect and neutralize.

Clearing landmines is slow and dangerous work. The casualty rate for de-mining personnel is near one casualty to 1000 mines cleared, but depending on the techniques used this rate can run as high as one casualty to 100 mines cleared. Crude mine clearing efforts frequently involve just an individual with a simple metal detector and a long stick. Although many more sophisticated approaches to mine clearing have been devised, they are generally very expensive. Heavily armored tanks that flail the ground with chains to intentionally detonate mines have been used on the battlefield since D-day. De-mining vehicles have also employed plows and giant rakes, and low-flying helicopters have dragged huge chain mats to explode and neutralize minefields.

To decrease the danger to de-mining personnel, many complex and expensive robotic devices have also been proposed. See, e.g., U.S. Pat. No. 6,026,135 to McFee et al., and U.S. Pat. No. 6,333,631 to Das et al. Recent high-technology proposals for detecting, classifying and assessing underground mines include the use of ground penetrating radar, ultrasonic sonar and passive infrared and microwave sensing. These technologies address the effectiveness of detecting mines, but do not address the portability requirements for individual soldier de-mining, nor the low-cost requirements for civilian de-mining applications.

Probably the greatest technical challenge for mine detectors is the ability to effectively discriminate mines and unexploded ordnance (UXO) from other underground debris. Current state-of-the-art electromagnetic induction (EMI) metal detectors can detect the small amount of metal in plastic-cased landmines at shallow depths under a wide range of environmental and soil conditions. However, small metal non-mine objects (i.e., clutter) commonly found in the environment are a major complication in mine detection because they represent false targets. It has been estimated that between 100 and 1000 false alarms occur from metal clutter in the environment for every real landmine detected. For time-efficient and cost-effective landmine clearing, the detected metal targets must be classified as to their threat potential: mine or clutter. In addition to a detection and classification sensor system, an effective, portable and inexpensive robotic platform is also needed to scan the sensor system over the minefield, thus removing de-mining personnel from eminent danger.

SUMMARY OF THE INVENTION

The present invention is a metal detector system that includes a chassis for supporting electromagnetic sensor components above a medium such as soil or water. A transmitter coil is attached to the chassis and induces an electromagnetic field in the medium beneath the chassis. The electromagnetic field creates eddy currents in metal objects in the medium. As the eddy currents decay, a first receiver coil is attached to one end of the chassis for receiving electromagnetic signals from the objects in the medium beneath the chassis. A second receiver coil attached to another end of the chassis also receives electromagnetic signals from the objects in the medium beneath the chassis. A propulsion system is attached to the chassis between the first and second receiver coils, or adjacent to the first and second receiver coils. The location of the propulsion system causes electromagnetic interference signals emanating from the propulsion system to be received at a nominally equal magnitude by each of the receiver coils. Finally, signal processing components add or subtract the outputs of the receiver coils, whereby interference signals emanating from the propulsion system and received by the receiver coils are nulled.

BRIEF DESCRIPTION OF THE DRAWINGS

For a more complete understanding of the present invention and the advantages thereof, reference is now made to the following detailed description taken in conjunction with the accompanying drawings in which.

DETAILED DESCRIPTION

Figure 1:
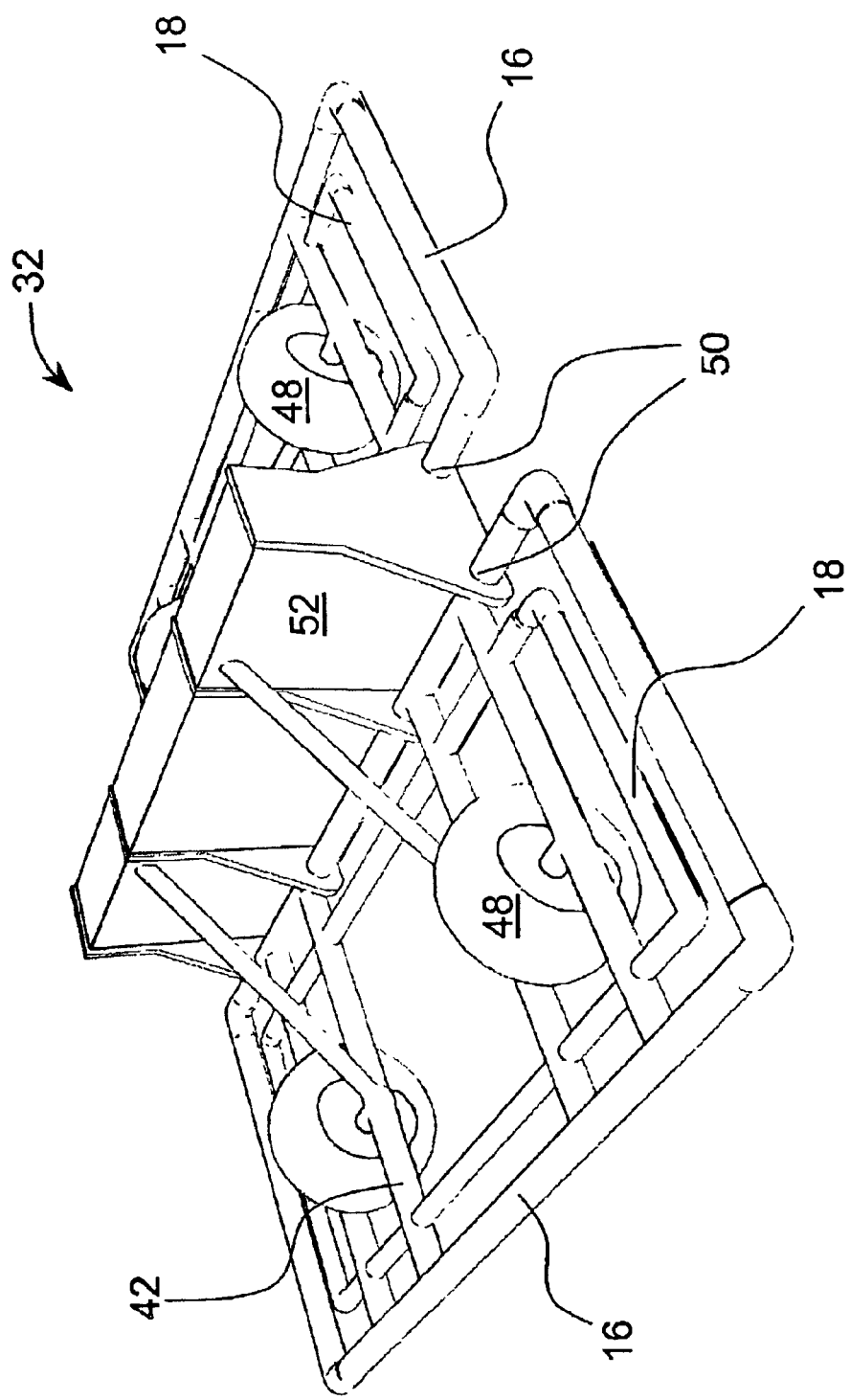
FIG. 1 is a simplified perspective view of one embodiment of a mine rover according to the present invention.

FIG. 1 is a simplified perspective view of one embodiment of a mine rover 32 according to the present invention. The embodiment shown is a small, compact, folding, low-metal content robotic system that supports a differential magnetic receiver time-domain (TD) EMI metal detector. The mine rover 32 is designed to search for metal objects while simultaneously moving over the ground (or through other mediums such as water). Once a metal object is detected, the rover 32 switches from a search mode to a metal object classification mode. The rover 32 is compact enough to be carried by one person. In a preferred embodiment, the mine rover 32 includes:

a metal detector: including two magnetic field transmitter coils 16 and two receiver coils 18; and a foldable electromechanical support system or robot: including a non-metallic chassis 42 that is foldable at hinge points 50 and that supports the transmitter coils 16 and receiver coils 18, and a housing 52 located on an electromagnetic symmetry axis (e.g., the mechanical centerline) of the chassis 42 for housing metallic components such as propulsion, navigation, and computer components.

The novel electromechanical layout of the mine rover 32 allows a highly sensitive EMI metal detector to operate in close proximity to metal components including metal components of the robot system electronics and the propulsion system. Operating in a differential mode, the symmetrically placed metal detecting EMI receiver coils 18 null the potential interfering electromagnetic signals from the metal components of the system.

The embodiment of the mine rover 32 shown in FIG. 1 employs an Electromagnetic Target Discriminator (ETD) sensor system that, like other metal detectors, is based on EMI. The ETD sensor system has the capability to detect, discriminate from clutter and identify low metal content (e.g., plastic-cased), medium and high metal content landmines. Compared to conventional EMI metal detectors, the ETD sensor's discrimination feature results in a lower false alarm rate from metal clutter. The ETD sensor system operates on the principle of eddy current time decay. A pulsed magnetic field excites eddy currents in a target. The time decay of the target's eddy currents is a function of the target's mechanical, electrical and magnetic properties. A target's identity can be determined by combining accurately measured time decay characteristics of the target with a classifier algorithm. In addition, the ETD system is capable of detecting very low metal and no metal content mines via the void they create in some types of electrically lossy soils. The ability to detect the coincident void and metal from low metal mines improves the detection and discrimination capability of the system.

The basic pulsed-EMI technique used for metal detection can be described as follows: A current loop transmitter is placed in the vicinity of a buried metal target, and a steady current flows in the transmitter. The transmitter loop current is then turned off. According to Faraday's Law, the collapsing magnetic field induces an electromotive force (emf) in nearby conductors. This emf causes eddy currents to flow in the conductors. Because there is no energy to sustain the eddy currents, they begin to decrease with a characteristic decay time that depends on the size, shape, and electrical and magnetic properties of the conductor. The decay currents generate a secondary magnetic field, the time rate-of-change of which is detected by a receiver coil located above the ground. The signal received by the receiver coil is a combination of the eddy currents from the metal target as well as the soil.

In the time-domain, the eddy current time decay response from a metal target can be expressed as:

$$V(t) = \delta(t) - \sum_i [A_i \exp\{-t/\tau_i\}] \qquad \text{Eqn. (1)}$$

where t is time, V(t) is the induced voltage in the receiver coil, $\delta(t)$ is the delta function, $A_i$ are target amplitude response coefficients, and $\tau_i$ are the target's time constants. Thus, the sensor response to a metal target is a sum of exponentials with a series of characteristic amplitudes, $A_i$, and time constants, $\tau_i$. A similar expression can be written for a frequency domain (FD) sensor. Eqn. (1) forms the theoretical basis of an EMI sensor's classification technique. If a target is shown to have a unique time decay response, a library of potential threat targets can be developed. When a metal target is encountered in the field, its time decay response can be compared to those in the library and, if a match is found, the target can be classified.

Figure 2:
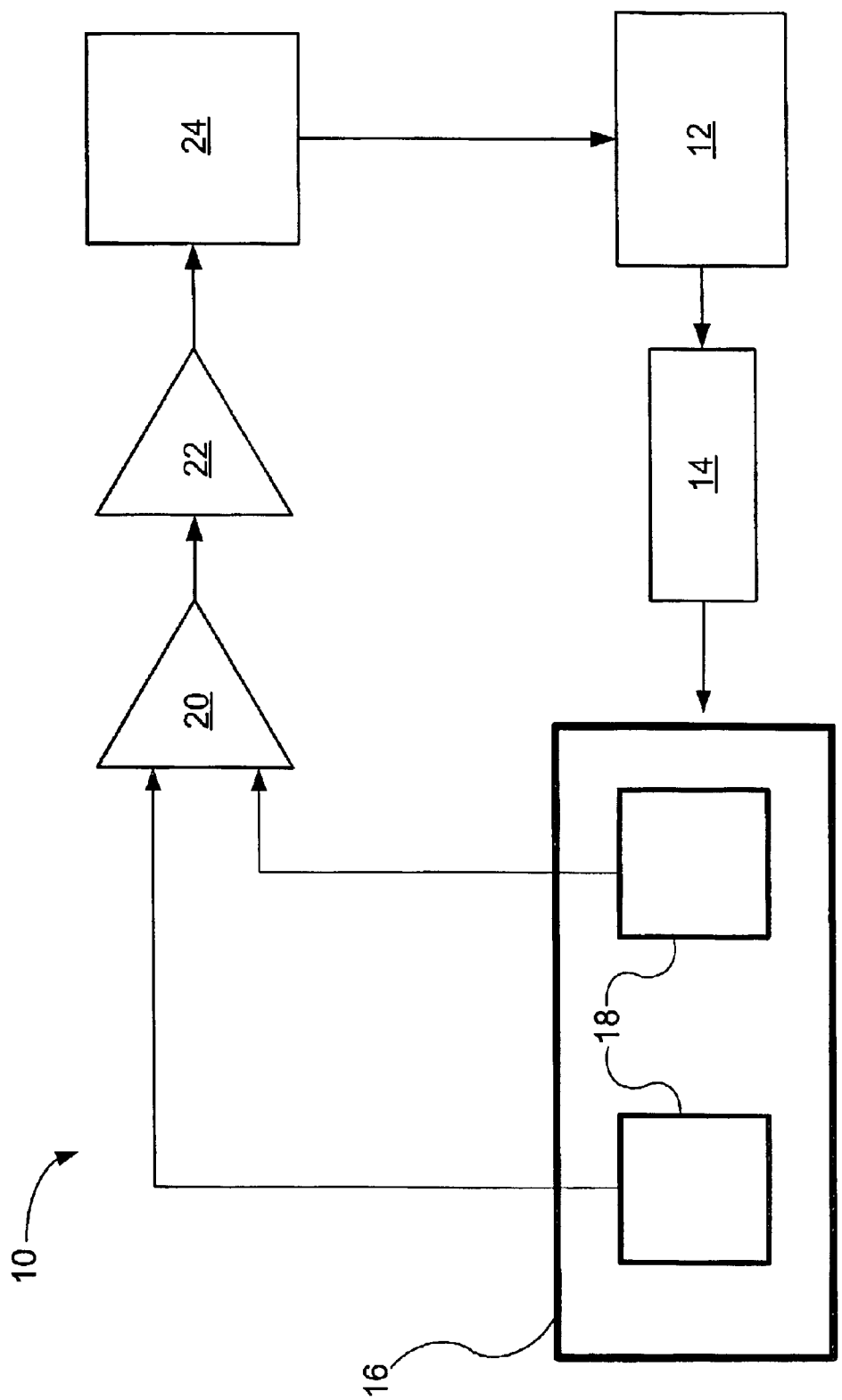
FIG. 2 is a schematic diagram of one embodiment of an Electromagnetic Target Discriminator (ETD) sensor according to the present invention.

FIG. 2 is a schematic diagram of one embodiment of an ETD sensor 10 according to the present invention. The sensor 10 includes a single-board computer 12 that controls a current source feeding a high-speed switching circuit 14. A transmitter coil 16 receives current from the switching circuit 14 and induces a voltage in a nearby conductor (not shown in FIG. 2) such as a mine. When the current in the transmitter coil 16 is switched off, decaying eddy currents in the conductor induces a decaying secondary magnetic field signal that is detected in two receiver coils 18. The receiver coils 18 in the embodiment shown in FIG. 2 are loop receivers, although other types of magnetic sensors could be used. The signals from the receiver coils 18 are then processed in a wide bandwidth differential preamplifier 20, and a multi-stage, high-bandwidth receiver coil amplifier 22. The resulting signal is then recorded in a high-speed, analog-to-digital converter and data acquisition system (DAS) 24 that is controlled by the computer 12. The computer 12 then performs target detection and classification by comparing the data from a given target with a library of mine target signatures that are stored on a computer usable medium such as a hard drive. The computer 12 may also perform automatic navigation functions or act as an interface to operator navigation control.

Referring again to FIG. 1, note that the embodiment shown employs two transmitter coils 16, instead of just one transmitter coil 16 as illustrated in the schematic diagram of FIG. 2. The embodiment selected for a given application will depend on various design parameters. Having two transmitter coils 16 creates a higher magnetic field in the search area near the transmitter coil 16 and, hence, can use less power for the same detection efficiency because each coil 16 can be focused on a smaller area of ground.

A measure of bandwidth of the ETD sensor 10 is the inverse of the current turnoff time generated by the high-speed switching circuit 14. In one embodiment, the current in the transmitter coil 16 turns off in about 300 ns, which gives a frequency bandwidth of about 3 MHz. In practice, the sensor 10 has the ability to measure decay times of less than 1 µs. The fast response of the sensor 10 provides confidence that rapid decay features seen in resulting data are real and not an artifact of the sensor's response. The high bandwidth of the ETD sensor 10 allows very accurate measurement of a metal target's time decay. Even signatures from targets made from stainless steel components, such as the TS-50 anti-personnel (AP) mine (which is difficult for conventional metal detectors to detect, let alone measure a signature) can be measured with the ETD sensor 10.

Figure 3A:
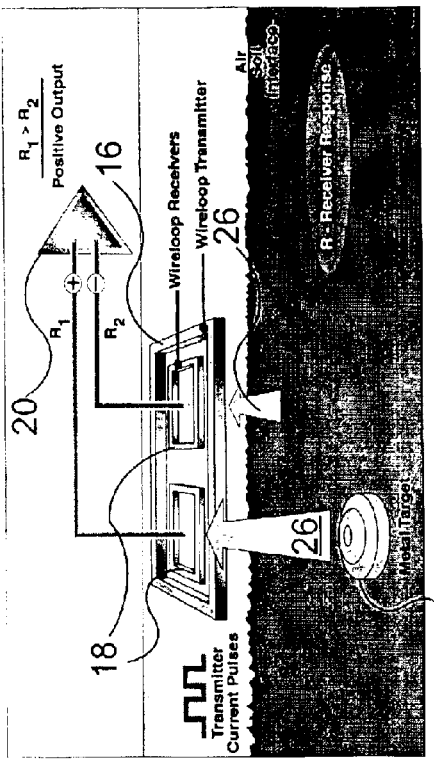
FIGS. 3A–3C are concept drawings of an ETD sensor operating under three conditions, respectively: no target, a metal target and a void target.
Figure 3B:
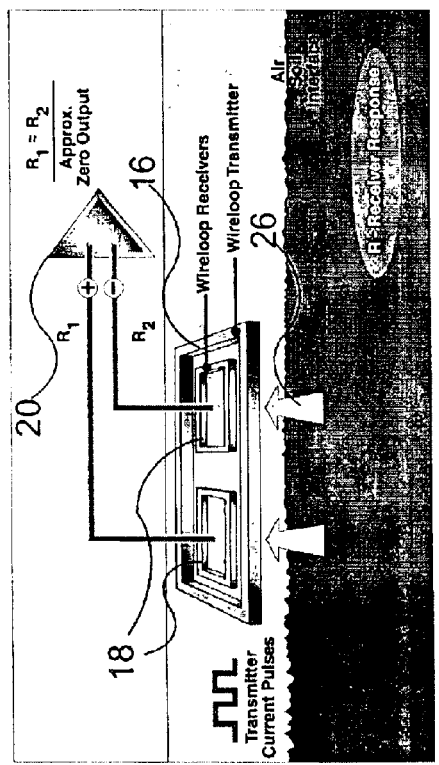
Figure 3C:
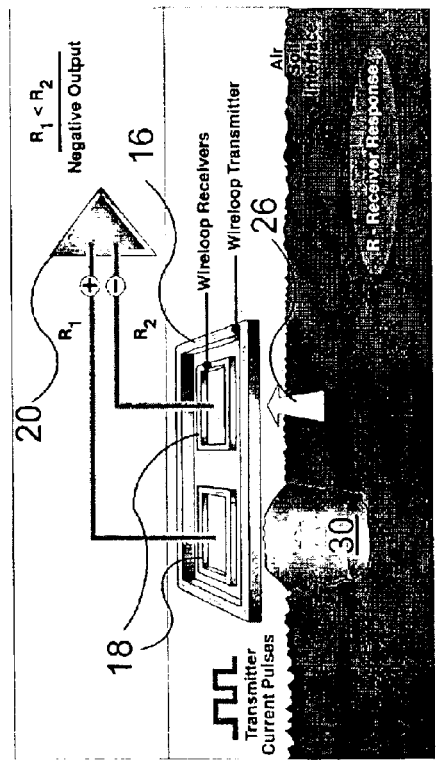

The two receiver coils 18 of the ETD sensor 10 are used to balance signals to improve sensor performance under a wide variety of environmental conditions. The two coils 18 minimize background electromagnetic interference so that the sensor 10 can operate in high electrical noise environments. The balanced receiver coils 18 also provide automatic ground balancing which is important in magnetic and electrically conductive soils. The balanced receiver coil design for metal and void detection may be better understood by referring to simplified drawings of the sensor operation. FIGS. 3A–3C are concept drawings of the ETD sensor operation under three conditions, respectively: no target, metal target and a void target. The upward pointing arrows 26 represent the eddy current target response. The size of the arrows 26 represent the relative amplitudes of the response. FIG. 3A shows the case where there is no target but soil. Assuming that the two receiver coils 18 are perfectly balanced, and the soil is homogeneous and contains no metal parts, the two receiver coils 18 "see" the same soil eddy current response. The differential amplifier 20 subtracts the two nominally identical signals and what is left is a zero output from the amplifier 20. FIG. 3B illustrates a large metal target 28 under one receiver coil 18. The response of the metal target 28 is larger than the soil response and when the differential amplifier 20 subtracts the two signals there is a positive output. FIG. 3C shows the void effect. Here, a void 30 is the decrease or absence of a soil decay response under one of the receiver coils 18. When the signals from the two coils 18 are differenced, the amplifier output is less than zero.

The ETD sensor 10 can operate as either a frequency domain or a time domain (i.e., pulsed) system. In a frequency domain mode, the transmitter coil 16 is excited with an oscillator (typically at frequencies of 1000 Hz to 100,000 Hz) and the system 10 is moderately immune to broadband electrical noise. Under conditions when the time domain mode is preferred, one should use various noise reduction techniques such as ensemble signal averaging. The time domain mode tends to have a broad electrical bandwidth and, hence, is more susceptible to electrical interference than the frequency domain mode. However, the broad electrical bandwidth enhances the time domain detection of fast decaying eddy currents typical of some landmines such as the TS-50.

Figure 4:
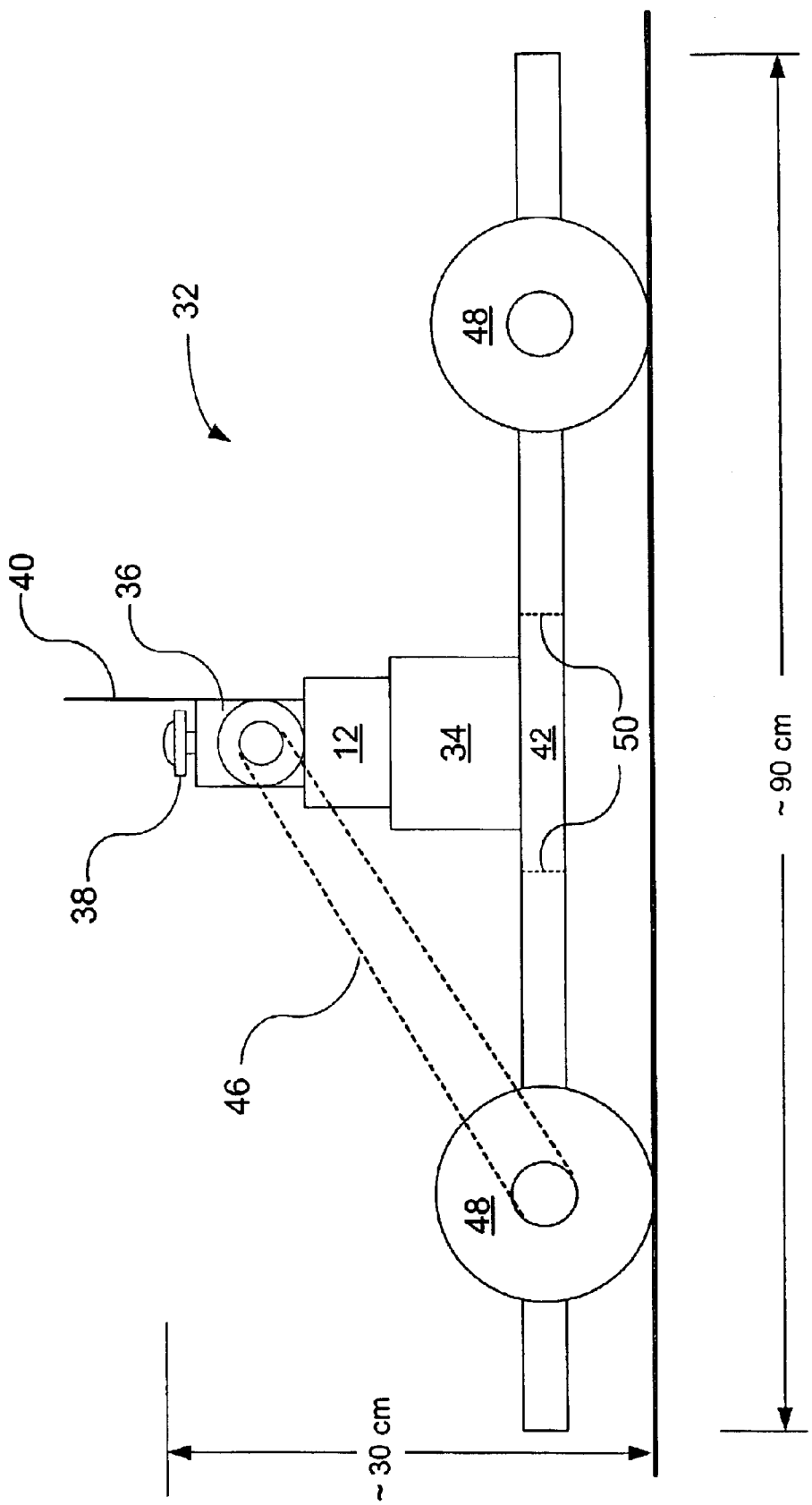
FIG. 4 is a schematic drawing of a side view of one embodiment of a mine rover according to the present invention.
Figure 5:
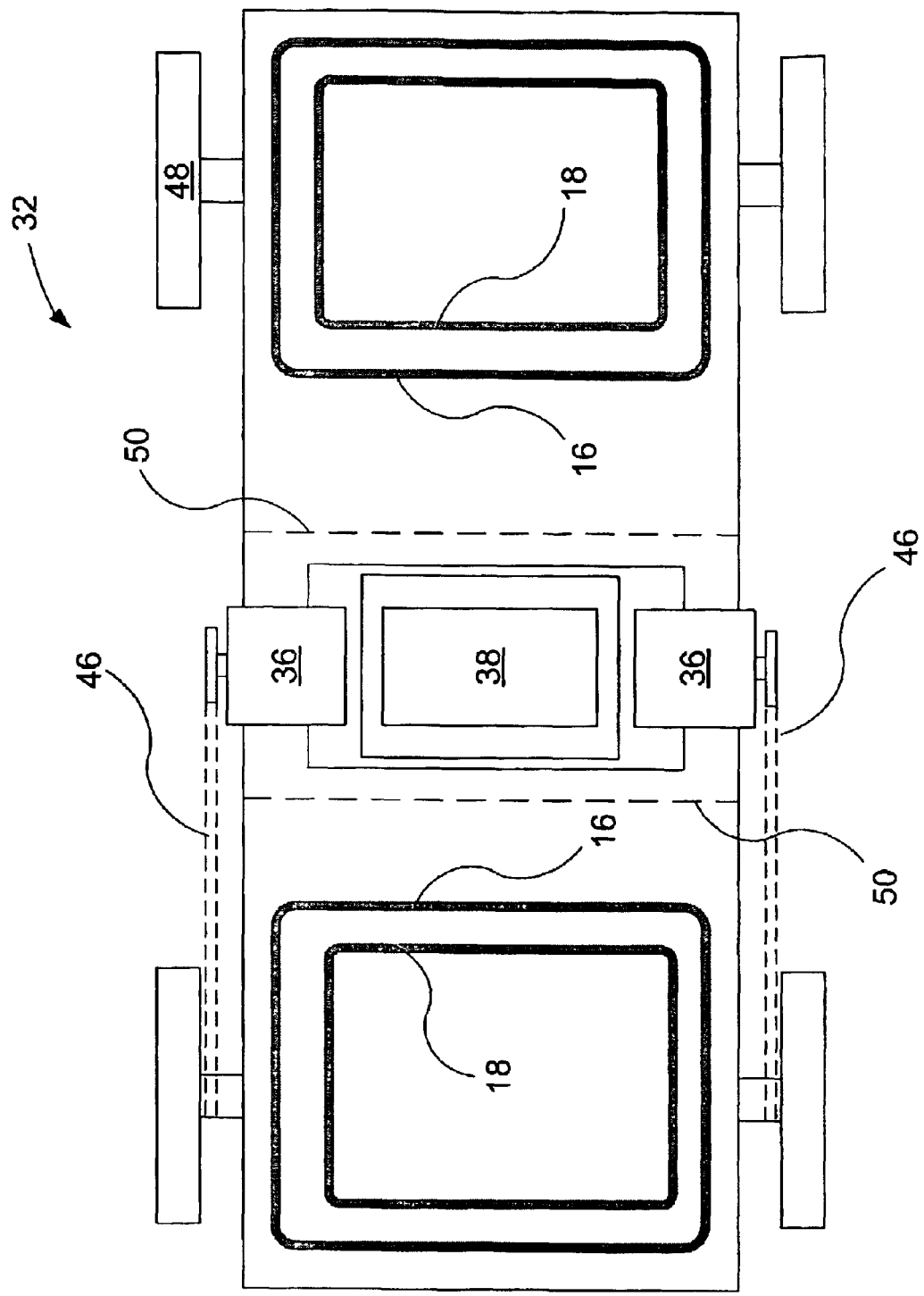
FIG. 5 is a schematic drawing of a top view of one embodiment of a mine rover according to the present invention.

As part of a mine detection system, the ETD sensor 10 must be scanned over an area of ground that needs to be de-mined. As described above the metal detecting/scanning operation is enabled, in a preferred embodiment of the present invention, by incorporating the ETD sensor 10 into the portable robot platform called the mine rover 32. The rover 32 is a robotic vehicle that can be configured for autonomous or person-in-the-loop control. FIGS. 4 and 5 are schematic diagrams of a side view and a top view, respectively, of an embodiment of the rover 32 including a simple wheel system. In general, the rover 32 is a small, compact, folding, low-metal content vehicle that supports the ETD sensor 10. The size of the rover 32 is entirely scalable and is dictated by a number of factors such as: mission length, number of sensors, power requirements, search rate and search width. The embodiment of the rover 32 shown in FIGS. 4 and 5 is about 90 cm long, about 30 cm tall, and has a search width of about 1 m. The embodiment includes a battery 34, computer 12, electric motors 36, GPS navigation system 38, and a communication antenna 40 all mounted along the midpoint of a chassis 42. Drive chains 46 or non-metallic belts are attached to the motors 36 and power the wheels 48. As will be obvious to those skilled in the art, various other propulsion systems, including gasoline and diesel engines, may be used in place of the electric motors 36.

Grouping the metal and electric components of the rover 32 along the midpoint of the chassis 42 serves two primary functions: a) it makes the design more compact and portable by enabling the chassis 32 to be folded at two hinge points 50 for storage or transport; and b) it enables electrical interference created by the rover 32 itself to be more effectively nulled or cancelled by the ETD sensor 10, as discussed in more detail below.

A prototype rover 32 with a lead-acid battery pack weighs about 16 Kg (35 pounds). Because the rover 32 is relatively long and wide, and it would be awkward to store or carry in its deployed configuration. However, a compact and portable package is created when both ends of the chassis 42 are folded about the hinge points 50.

The four-wheeled version of the rover 32 is inexpensive and would be practical for many on-route (e.g., roads and foot paths) conditions. However, as would be apparent to those skilled in the art, many different wheeled, tank-track or leg systems could be used for different environments. Use of the rover 32 in other mediums is also anticipated. For example a swimming, underwater version of the rover 32 using the same general design novelties as described above would include an underwater propulsion system (e.g., employing propellers). Many other options to the rover 32 will also be readily apparent to those skilled in the art. Such options include a mine marker using possibly a small spray paint system; a remote operator interface including a processor for display of target maps; a navigation system involving human operators, global positioning system (GPS) or differential GPS (DGPS) or inertial systems; and a video camera for visual inspection of suspected mine locations. Ground penetrating radar for improved detection of plastic-cased low-metal mines or chemical and biological weapons detectors is also feasible.

Figure 6:
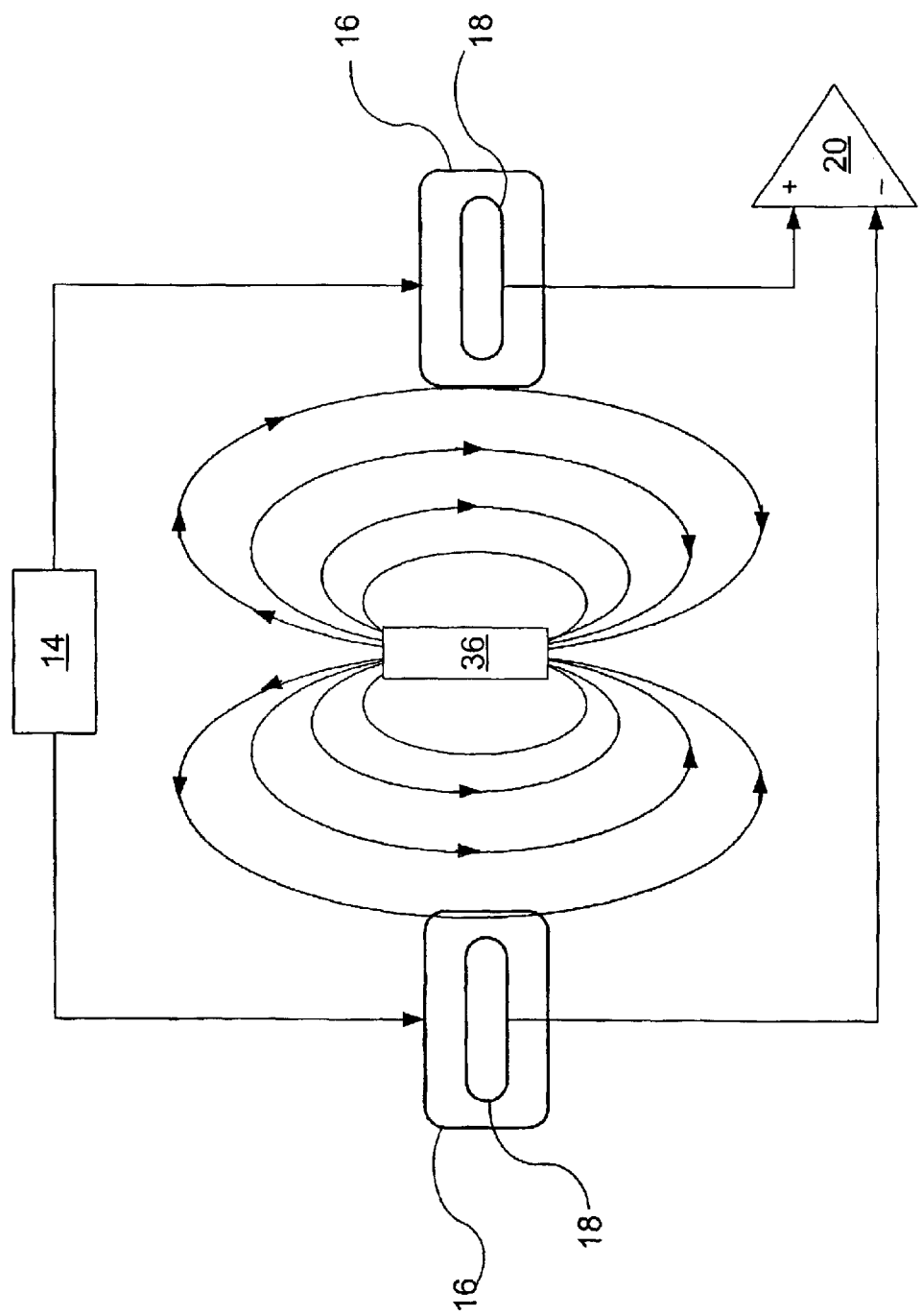
FIG. 6 is a schematic diagram that illustrates how grouping metal and electric components on the mine rover near the midpoint of the chassis enables electrical interference created by the components to be more effectively cancelled by the ETD sensor.

The mechanical layout of the rover 32 as shown in FIGS. 4 and 5 enables a highly sensitive ETD sensor 10 to operate in close proximity to metal components such as the system electronics, battery and drive motors 36. Non-metallic components, such as inexpensive polyvinyl chloride (PVC) piping, may be used to fabricate the structural frame of the rover's chassis 42. FIG. 6 is a schematic diagram that illustrates how grouping the metal components of the rover 32, such as the drive motors 36, near the midpoint of the chassis 42 enables electrical interference created by the components to be more effectively cancelled by ETD sensor 10. As discussed above, when the magnetic field created by the transmitter coils 16 is turned off, eddy currents are established in nearby metal. In addition to exciting eddy currents in the metal in nearby mines and other buried objects, eddy currents are also excited in the metal components in the rover 32 (e.g., in the propulsion and electronic systems).

When the rover's metal components are located symmetrically along the centerline of the chassis 42, between the two receiver coils 18, their eddy currents will be detected equally by the receivers (i.e., as a common-mode signal). Because the rover's eddy currents are of the same polarity, they will cancel each other in the ETD sensor's differential amplifier 20. An alternate method for canceling such noise involves counter-winding the receiver coils 18 so that the detected common-mode signals are nulled directly without the need for the differential amplifier 20. Any minor mismatch in the metal symmetry of the rover's components and the receiver coils 18 can be automatically or manually nulled or cancelled with appropriate tuning components attached to the chassis 42. Such tuning or balancing components may include pieces of metal or passive electronics such as simple RL circuits. Such balancing could also be performed in a post-processing step by software in the computer 12.

Other methods for reducing electrical interference from the drive motor 36 include encasing the drive motor inside an electromagnetic shield, and multiplexing the operation of the motor 36 and the ETD sensor 10. Both methods may be used, singly or in combination, depending on the sensitivity of the sensor 10 and the canceling effect of the differential receiver coils 18. Multiplexing the motor 36 and the sensor 10 means that the two components do not operate at the same time and therefore do not interfere with each other. In a time domain system, the transmitter coil 16 is energized by current and requires a short time period to build up to a peak value. During that time period the DAS 24 does not sample signals from the receiver coil 18. Only when the transmitter coil current is turned off, inducing eddy currents in nearby metal objects, does the DAS 24 sample signals from the receiver coil 18. Therefore during the period that the transmitter coil current is building up, the drive motor 36 can be activated without interfering with the operation of the ETD sensor 10. Similarly, for optimal sensitivity, in a frequency domain metal detector the transmitter coil 16 is excited with alternating current when the motor 36 is off and the DAS 24 collects data for metal detection during this time period. In some cases, with a well-shielded electric motor 36, a frequency domain metal detector may be able to operate simultaneously with the operation of the motor 36.

Figure 7:
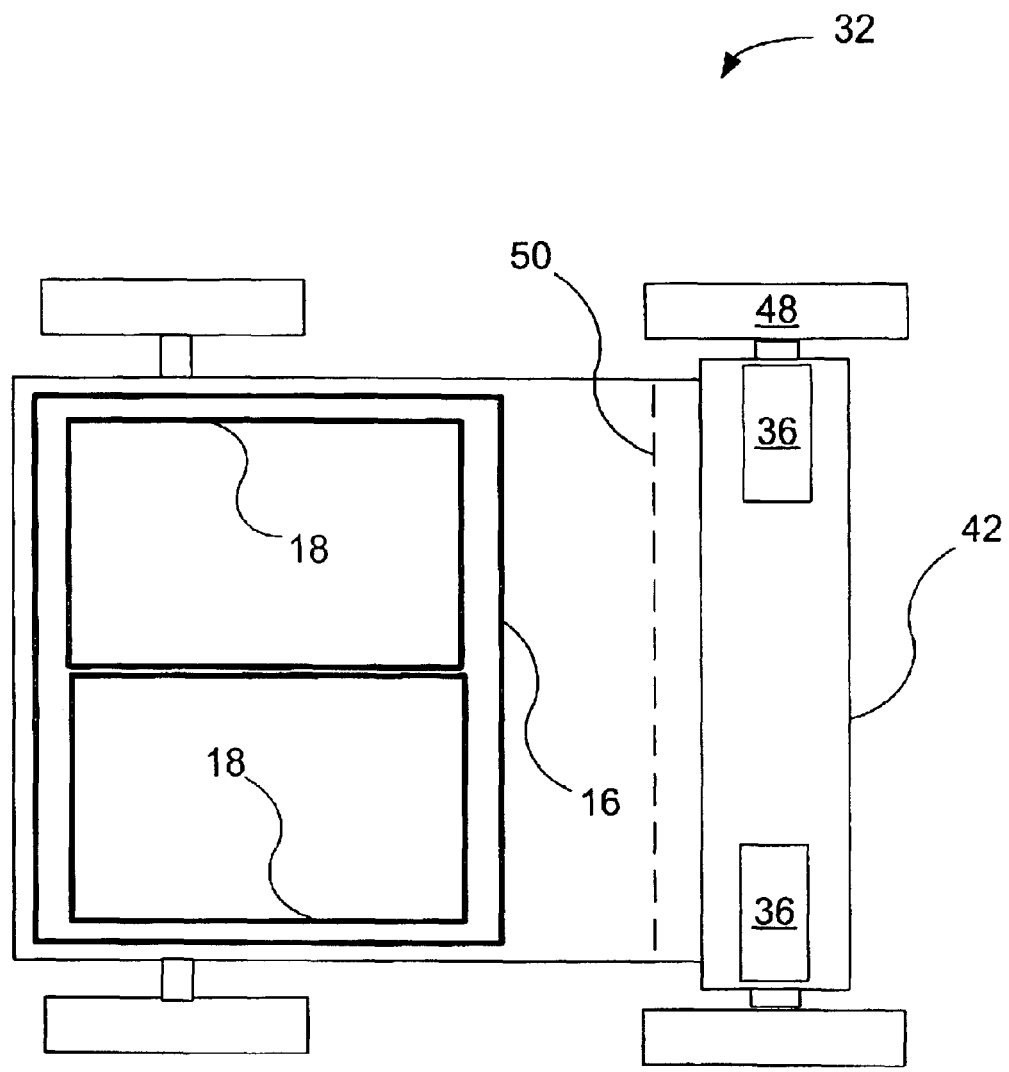
FIG. 7 is a schematic drawing of an embodiment of the mine rover according to the present invention that enables the folded package to be even more compact.

Finally, FIG. 7 is a schematic diagram of another embodiment of the rover 32 that enables the folded package to be even more compact. The principles of operation are the same as in the embodiment shown in FIGS. 4 and 5. However in the embodiment shown in FIG. 7 the axis of symmetry for the rover's metal components is turned 90 degrees and is now perpendicular to the centerline about which the rover 32 is folded. This configuration will result in a smaller and lighter mechanical system.

The above therefore discloses a portable mine detection and classification system including a portable and inexpensive robotic platform. Alterations, modifications, and improvements will readily occur to those skilled in the art. Such alterations, modifications, and improvements as are made obvious by this disclosure are intended be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A metal detector system comprising:
   a chassis for supporting electromagnetic sensor components above a medium, said chassis having first and second ends;
   a first transmitter coil attached to said chassis for inducing an electromagnetic field in the medium beneath said chassis;
   a first receiver coil attached to said first end of said chassis for receiving electromagnetic signals from objects in the medium beneath said chassis, said first receiver coil having an output;
   a second receiver coil attached to said second end of said chassis for receiving electromagnetic signals from objects in the medium beneath said chassis, said second receiver coil having an output;
   a propulsion system attached to said chassis between said first and second receiver coils, whereby an electromagnetic interference signal emanating from said propulsion system is received at a nominally equal magnitude by each of said first and second receiver coils;
   signal processing components operatively connected to said outputs of said first and second receiver coils for adding or subtracting said outputs of said first and second receiver coils, whereby said interference signal emanating from said propulsion system and received by said first and second receiver coils is nulled;
   a data acquisition system operatively connected to said signal processing components; and
   a computer usable medium having computer readable program code means embodied therein, operatively connected to said data acquisition system, for comparing a signature signal from said data acquisition system with a library of signature signals stored on said computer usable medium, whereby a signature signal from an object or void in the medium beneath said chassis is compared with said library of signature signals from objects of interest such as landmines.

2. A metal detector system comprising:
   a chassis for supporting electromagnetic sensor components above a medium, said chassis having first and second ends;
   a first transmitter coil attached to said chassis for inducing an electromagnetic field in the medium beneath said chassis;
   a first receiver coil attached to said first end of said chassis for receiving electromagnetic signals from objects in the medium beneath said chassis, said first receiver coil having an output;
   a second receiver coil attached to said second end of said chassis for receiving electromagnetic signals from objects in the medium beneath said chassis, said second receiver coil having an output;
   a propulsion system attached to said chassis between said first and second receiver coils, whereby an electromagnetic interference signal emanating from said propulsion system is received at a nominally equal magnitude by each of said first and second receiver coils;
   signal processing components operatively connected to said outputs of said first and second receiver coils for adding or subtracting said outputs of said first and second receiver coils, whereby said interference signal emanating from said propulsion system and received by said first and second receiver coils is nulled; and
   hinge points on said chassis such that said chassis is foldable for storage or transport.

3. A metal detector system comprising:
- a chassis for supporting electromagnetic sensor components above a medium, said chassis having first and second ends;
- a first transmitter coil attached to said chassis for inducing an electromagnetic field in the medium beneath said chassis;
- a first receiver coil attached to said first end of said chassis for receiving electromagnetic signals from objects in the medium beneath said chassis, said first receiver coil having an output;
- a second receiver coil attached to said second end of said chassis for receiving electromagnetic signals from objects in the medium beneath said chassis, said second receiver coil having an output;
- a propulsion system attached to said chassis between said first and second receiver coils, whereby an electromagnetic interference signal emanating from said propulsion system is received at a nominally equal magnitude by each of said first and second receiver coils;
- signal processing components operatively connected to said outputs of said first and second receiver coils for adding or subtracting said outputs of said first and second receiver coils, whereby said interference signal emanating from said propulsion system and received by said first and second receiver coils is nulled; and
- a second transmitter coil, wherein said first transmitter coil is positioned around said first receiver coil and said second transmitter coil is positioned around said second receiver coil.

4. A metal detector system comprising:
- a chassis for supporting electromagnetic sensor components above a medium, said chassis having first and second ends;
- a first transmitter coil attached to said chassis for inducing an electromagnetic field in the medium beneath said chassis;
- a first receiver coil attached to said first end of said chassis for receiving electromagnetic signals from objects in the medium beneath said chassis, said first receiver coil having an output;
- a second receiver coil attached to said second end of said chassis for receiving electromagnetic signals from objects in the medium beneath said chassis, said second receiver coil having an output;
- a propulsion system attached to said chassis between said first and second receiver coils, whereby an electromagnetic interference signal emanating from said propulsion system is received at a nominally equal magnitude by each of said first and second receiver coils;
- signal processing components operatively connected to said outputs of said first and second receiver coils for adding or subtracting said outputs of said first and second receiver coils, whereby said interference signal emanating from said propulsion system and received by said first and second receiver coils is nulled; and
- tuning components attached to said chassis for balancing electromagnetic interference between said two receiver coils.

5. The mine detector system as recited in claim 4, wherein said tuning components comprise passive RL circuits.

6. A metal detector system comprising:
- a chassis for supporting electromagnetic sensor components above a medium, said chassis having first and second ends;
- a first transmitter coil attached to said chassis for inducing an electromagnetic field in the medium beneath said chassis;
- a first receiver coil attached to said first end of said chassis for receiving electromagnetic signals from objects in the medium beneath said chassis, said first receiver coil having an output;
- a second receiver coil attached to said second end of said chassis for receiving electromagnetic signals from objects in the medium beneath said chassis, said second receiver coil having an output;
- a propulsion system attached to said chassis between said first and second receiver coils, whereby an electromagnetic interference signal emanating from said propulsion system is received at a nominally equal magnitude by each of said first and second receiver coils; and
- signal processing components operatively connected to said outputs of said first and second receiver coils for adding or subtracting said outputs of said first and second receiver coils, whereby said interference signal emanating from said propulsion system and received by said first and second receiver coils is nulled;
- wherein operation of said propulsion system and excitation of said transmitter coil are multiplexed to minimize electromagnetic interference with said receiver coils.

7. A metal detector system comprising:
- a chassis for supporting electromagnetic sensor components above a medium, said chassis having first and second ends;
- a first transmitter coil attached to said chassis for inducing an electromagnetic field in the medium beneath said chassis;
- a first receiver coil attached to said first end of said chassis for receiving electromagnetic signals from objects in the medium beneath said chassis, said first receiver coil having an output;
- a second receiver coil attached to said second end of said chassis for receiving electromagnetic signals from objects in the medium beneath said chassis, said second receiver coil having an output;
- a propulsion system attached to said chassis between said first and second receiver coils, whereby an electromagnetic interference signal emanating from said propulsion system is received at a nominally equal magnitude by each of said first and second receiver coils; and
- signal processing components operatively connected to said outputs of said first and second receiver coils for adding or subtracting said outputs of said first and second receiver coils, whereby said interference signal emanating from said propulsion system and received by said first and second receiver coils is nulled;
- wherein said propulsion system is magnetically shielded to minimize electromagnetic interference with said receiver coils.

* * * * *